(12) United States Patent
Davis et al.

(10) Patent No.: US 10,882,427 B2
(45) Date of Patent: Jan. 5, 2021

(54) SEAT ASSEMBLY INCLUDING AN ARMREST SUB-ASSEMBLY AND METHOD FOR FABRICATING THE SAME

(71) Applicant: Gulfstream Aerospace Corporation, Savannah, GA (US)

(72) Inventors: Allen Davis, Savannah, GA (US); Salvador Gonzalez, Savannah, GA (US); Timothy O'Hara, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 175 days.

(21) Appl. No.: 15/716,884

(22) Filed: Sep. 27, 2017

(65) Prior Publication Data

US 2019/0092195 A1    Mar. 28, 2019

(51) Int. Cl.
*B60N 2/75* (2018.01)
*B64D 11/06* (2006.01)

(52) U.S. Cl.
CPC .......... *B60N 2/757* (2018.02); *B64D 11/0644* (2014.12)

(58) Field of Classification Search
CPC .......... B60N 2/757; B60N 2/77; B60N 2/767; B60N 2/753; B60N 2/773; B60N 2/793; B60N 2/763; A47C 1/03; A47C 1/0303; A47C 1/0307; A47C 1/0308
See application file for complete search history.

(56) References Cited

U.S. PATENT DOCUMENTS

| | | | | | |
|---|---|---|---|---|---|
| 2,691,408 | A | * | 10/1954 | Beard | B60N 2/787 297/411.25 |
| 2,824,599 | A | * | 2/1958 | Quinlan | A47C 7/70 297/146 |
| 3,168,346 | A | * | 2/1965 | Rei, Jr. | B60N 2/757 297/113 |
| 3,191,995 | A | * | 6/1965 | Shelton | B60N 2/76 297/411.33 |
| 3,779,600 | A | * | 12/1973 | Quakenbush | B60N 2/753 297/411.3 |
| 4,307,913 | A | * | 12/1981 | Spiegelhoff | A47C 1/03 297/411.33 |
| 4,435,011 | A | * | 3/1984 | Hakamata | B60N 2/757 297/113 |
| 4,533,175 | A | * | 8/1985 | Brennan | B64D 11/0693 297/113 |

(Continued)

FOREIGN PATENT DOCUMENTS

| | | |
|---|---|---|
| DE | 102008056290 A1 | 5/2010 |
| EP | 2729364 A1 | 5/2014 |

*Primary Examiner* — James M Ference
(74) *Attorney, Agent, or Firm* — LKGlobal | Lorenz & Kopf, LLP

(57) ABSTRACT

Seat assemblies and methods for fabricating seat assemblies are provided. In one example, a seat assembly includes a seat base portion. A seat backrest portion is configured to extend substantially upright from the seat base portion. An armrest sub-assembly is configured to move between a stowed position that is one of substantially within and laterally adjacent to the seat backrest portion and an extended position that is generally forward of the seat backrest portion. At least a portion of the armrest sub-assembly translates along an incline relative to the seat base portion during movement from the stowed position towards the extended position.

17 Claims, 9 Drawing Sheets

(56) References Cited

U.S. PATENT DOCUMENTS

| | | | | |
|---|---|---|---|---|
| 4,558,901 A * | 12/1985 | Yokoyama | B60N 2/767 | 297/113 |
| 4,657,305 A * | 4/1987 | Meiller | B60N 2/77 | 297/411.36 |
| 4,674,790 A * | 6/1987 | Johnson | B60N 2/763 | 296/153 |
| 4,872,727 A * | 10/1989 | Rye | A47C 1/03 | 297/411.36 |
| 4,984,847 A * | 1/1991 | Bedu | B60N 2/763 | 297/411.38 |
| 5,000,511 A * | 3/1991 | Shichijo | B64D 11/0015 | 297/117 |
| 5,246,267 A * | 9/1993 | Nagashima | B60N 2/757 | 297/113 |
| 5,382,079 A * | 1/1995 | Wilson | A47C 1/03 | 297/411.35 |
| 5,398,991 A * | 3/1995 | Smith | A47C 7/72 | 248/919 |
| 5,433,503 A * | 7/1995 | De Filippo | B60N 2/757 | 297/115 |
| 5,516,194 A * | 5/1996 | Maule | B60N 2/06 | 297/284.1 |
| 5,628,543 A * | 5/1997 | Filipovich | B60R 5/006 | 297/113 |
| 5,636,899 A * | 6/1997 | Schiff | B60N 2/77 | 297/411.36 |
| 5,749,629 A * | 5/1998 | Heath | B60N 2/753 | 297/411.36 |
| 5,911,470 A * | 6/1999 | Aumond | B60N 3/107 | 297/115 |
| 6,220,660 B1 * | 4/2001 | Bedro | B60N 2/79 | 297/188.04 |
| 6,547,323 B1 * | 4/2003 | Aitken | B60N 2/793 | 297/113 |
| 7,264,291 B2 * | 9/2007 | Radu | B60R 7/04 | 296/24.34 |
| 7,458,634 B2 * | 12/2008 | Schlecht | B60N 2/757 | 297/113 |
| 7,568,759 B2 * | 8/2009 | Schurg | B64D 11/0644 | 297/184.1 |
| 7,628,453 B2 * | 12/2009 | Herkenrath | B60N 2/0252 | 297/284.9 |
| 8,449,029 B2 * | 5/2013 | Runde | B60N 2/757 | 297/113 |
| 9,321,381 B2 | 4/2016 | Itzinger | | |
| 9,469,225 B1 * | 10/2016 | Salenbien | B60N 2/757 | |
| 2005/0006942 A1 * | 1/2005 | Bremner | B60N 2/773 | 297/411.36 |
| 2005/0194827 A1 * | 9/2005 | Dowty | B60N 2/643 | 297/411.3 |
| 2005/0218683 A1 * | 10/2005 | Toyota | B60N 2/062 | 296/64 |
| 2006/0119160 A1 * | 6/2006 | Ruspa | B60N 2/242 | 297/411.32 |
| 2007/0069544 A1 * | 3/2007 | Sturt | B60N 2/793 | 296/37.8 |
| 2007/0200414 A1 * | 8/2007 | Pozzi | B60N 3/001 | 297/411.32 |
| 2009/0167070 A1 * | 7/2009 | Chen | B60N 2/753 | 297/411.32 |
| 2010/0148561 A1 * | 6/2010 | Runde | F16H 25/18 | 297/411.33 |
| 2011/0115275 A1 * | 5/2011 | von Rothkirch und Panthen | B60N 2/77 | 297/411.32 |
| 2012/0223564 A1 * | 9/2012 | Andersson | B60N 2/787 | 297/411.3 |
| 2013/0002001 A1 * | 1/2013 | Allen | B60N 3/101 | 297/411.3 |
| 2015/0097406 A1 * | 4/2015 | Tanaka | B60N 2/5816 | 297/378.1 |
| 2015/0298587 A1 * | 10/2015 | Machael | A47C 1/03 | 297/411.38 |
| 2016/0001683 A1 * | 1/2016 | Bohlke | B60N 2/206 | 297/378.1 |
| 2016/0059761 A1 * | 3/2016 | Bohlke | B60N 3/102 | 296/37.8 |
| 2016/0272098 A1 * | 9/2016 | Barnes | B60N 3/001 | |
| 2016/0288672 A1 * | 10/2016 | Jakubec | B60N 2/43 | |
| 2017/0021749 A1 * | 1/2017 | Ward | B60N 2/757 | |
| 2017/0144572 A1 * | 5/2017 | Vander Sluis | B60R 11/00 | |
| 2019/0092195 A1 * | 3/2019 | Davis | B60N 2/757 | |

* cited by examiner

SEAT ASSEMBLY INCLUDING AN ARMREST SUB-ASSEMBLY AND METHOD FOR FABRICATING THE SAME

TECHNICAL FIELD

The technical field relates generally to seat assemblies, and more particularly, relates to seat assemblies including an armrest sub-assembly that is stowed within or laterally adjacent to a seat backrest and methods for fabricating such seat assemblies.

BACKGROUND

Seat assemblies, for example, for the commercial and/or military transportation industries (e.g., aircraft, motor vehicles, and the like) typically include an armrest for supporting an arm of a seat occupant. Some armrests are rotationally coupled to the backrest of the seat. The armrest is parallel to the backrest when the armrest is in the stowed position, and the armrest is rotated downward to an extended position that is perpendicular to the backrest. When the armrest is in the stowed position, the bottom portion of the armrest faces forward and is visibly exposed, which is aesthetically undesirable. Further, if two or more seat assemblies are adjacent to each other (e.g., a row of seats in an aircraft), when the armrest of one of the seats is in the extended position, a relatively large gap is present between the adjacent backrests of the seats, which is also aesthetically undesirable.

Alternatively, other armrests may be slidably coupled to the base portion of the seat assembly. In the stowed position, the armrest is buried between the base portions of the two adjacent seats with an upper portion of the armrest slightly elevated and parallel relative to the base portions of the seats. When an occupant is seated, if the occupant is positioned over the upper portion of a stowed armrest in the base portion of the seat, the armrest can undesirably cause some discomfort to the occupant. Further, an aesthetically undesirable gap is typically present between adjacent backrests of the seats to account for the height of the armrest when the armrest is moved vertically from the stowed position to the extended position.

Accordingly, it is desirable to provide improved seat assemblies including an armrest sub-assembly that overcomes one or more of the foregoing concerns. Furthermore, other desirable features and characteristics of the various embodiments described herein will become apparent from the subsequent detailed description and the appended claims, taken in conjunction with the accompanying drawings and this background.

SUMMARY

Seat assemblies and methods for fabricating seat assemblies are provided herein. In accordance with an exemplary embodiment, a seat assembly includes a seat base portion. A seat backrest portion is coupled to the seat base portion and is configured to extend substantially upright from the seat base portion. An armrest sub-assembly is configured to move between a stowed position that is one of substantially within and laterally adjacent to the seat backrest portion and an extended position that is generally forward of the seat backrest portion. At least a portion of the armrest sub-assembly translates along an incline relative to the seat base portion during movement from the stowed position towards the extended position.

In another exemplary embodiment, a seat assembly includes a seat frame including a seat base structure portion and a seat backrest structure portion that is configured to extend substantially upright from the seat base structure portion. A seat base portion includes a seat base cushion supported by the seat base structure portion. A seat backrest portion includes a seat backrest cushion supported by the seat backrest structure portion. An armrest sub-assembly includes a fixed guide structure arrangement coupled to the seat frame proximate a lower section of the seat backrest structure portion and extending along an incline relative to the seat base portion. A movable guide extension structure is slidingly coupled to the fixed guide structure arrangement to translate along the incline. An armrest portion has a distal forward-facing outer surface. The armrest portion is coupled to the movable guide extension structure to facilitate moving the armrest portion from a stowed position towards an extended position. In the stowed position, the distal forward-facing outer surface of the armrest portion is generally aligned with adjacent outer surface portions of the seat backrest cushion. In the extended position, the armrest portion is generally forward of the seat backrest cushion.

In accordance with an exemplary embodiment, a method for fabricating a seat assembly is provided. The method includes arranging a seat backrest portion to extend substantially upright from a seat base portion. An armrest sub-assembly is operatively coupled to the seat backrest portion such that the armrest sub-assembly is moveable between a stowed position that is one of substantially within and laterally adjacent to the seat backrest portion and an extended position that is generally forward of the seat backrest portion. At least a portion of the armrest sub-assembly translates along an incline relative to the seat base portion during movement from the stowed position towards the extended position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies and methods for fabricating seat assemblies. The exemplary embodiments taught herein provide a seat assembly including a seat base portion and a seat backrest portion that extends substantially upright from the seat base portion. An armrest sub-assembly is operatively coupled to a lower portion of the seat backrest portion. The armrest sub-assembly is stowed substantially within or laterally adjacent to the seat backrest portion, such as, for example, within the lower portion of the seat backrest portion adjacent to the seat base portion. The armrest sub-assembly includes an armrest portion and is configured to move from the stowed position to an extended position that is generally forward of the seat backrest portion so that the armrest portion is positioned for supporting an arm of a seat occupant. During movement from the stowed position towards the extended position, at least a portion of the armrest sub-assembly translates along an incline relative to the seat base portion to position the armrest portion above and spaced apart from a lateral section of the seat base portion.

It has been found that by stowing the armrest sub-assembly substantially within the lower portion of the seat backrest portion adjacent to the seat base portion, the armrest portion including its bottom section is substantially visibly concealed, which is aesthetically desirable. Additionally, any space or exposed gap for stowing the armrest sub-assembly is substantially minimized. Further, when a seat occupant is positioned on the base portion of the seat, the armrest sub-assembly is stowed in the seat backrest portion away from the base portion of the seat to provide a relatively more comfortable seat assembly for the seat occupant. The armrest sub-assembly can then be conveniently deployed by the seat occupant by moving at least a portion of the armrest sub-assembly along an incline relative to the seat base portion to the extended position.

Figure 1:
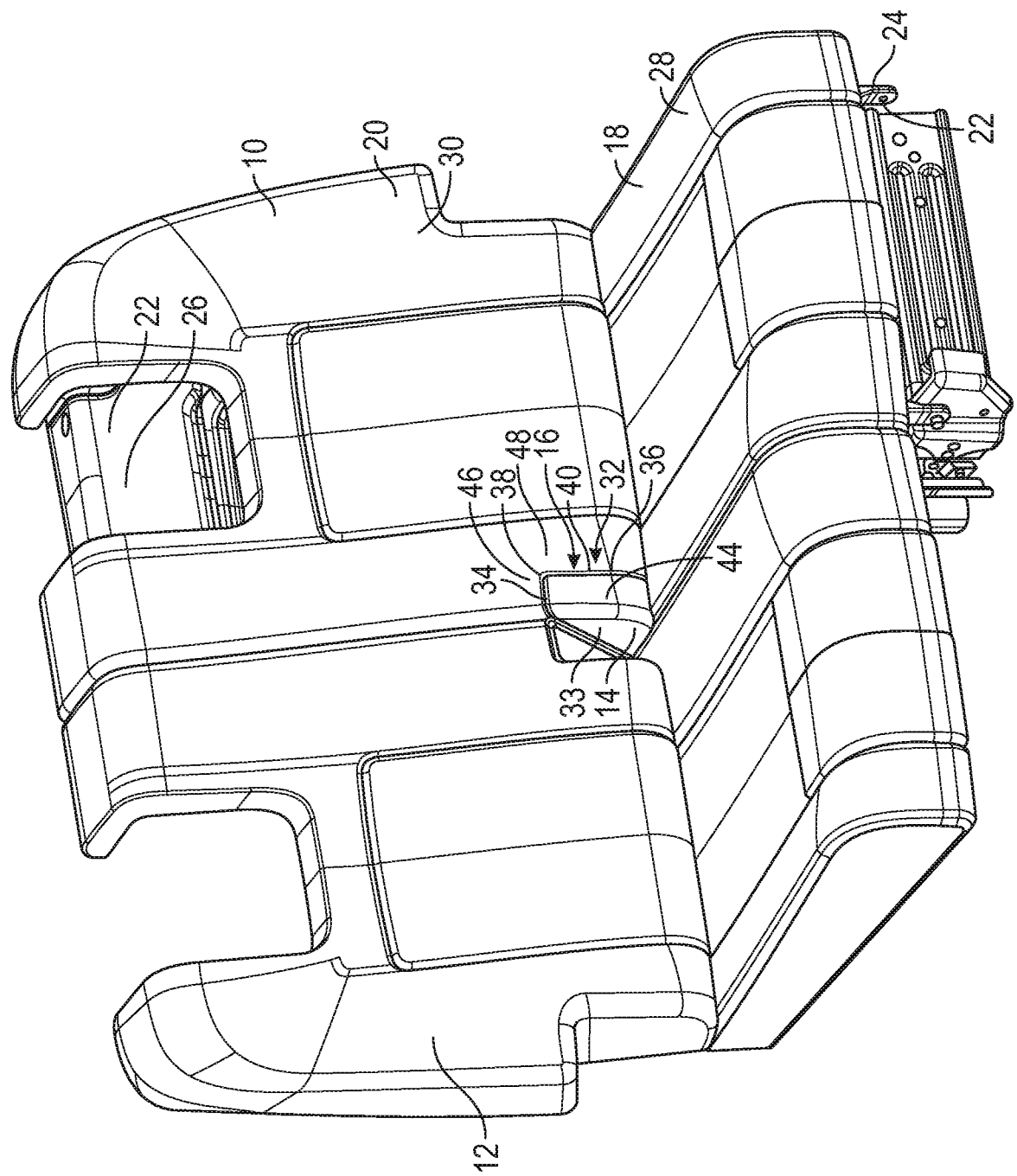
FIG. 1 illustrates a perspective view of two adjacent seat assemblies with an armrest sub-assembly in a stowed position in accordance with an exemplary embodiment.
Figure 2:
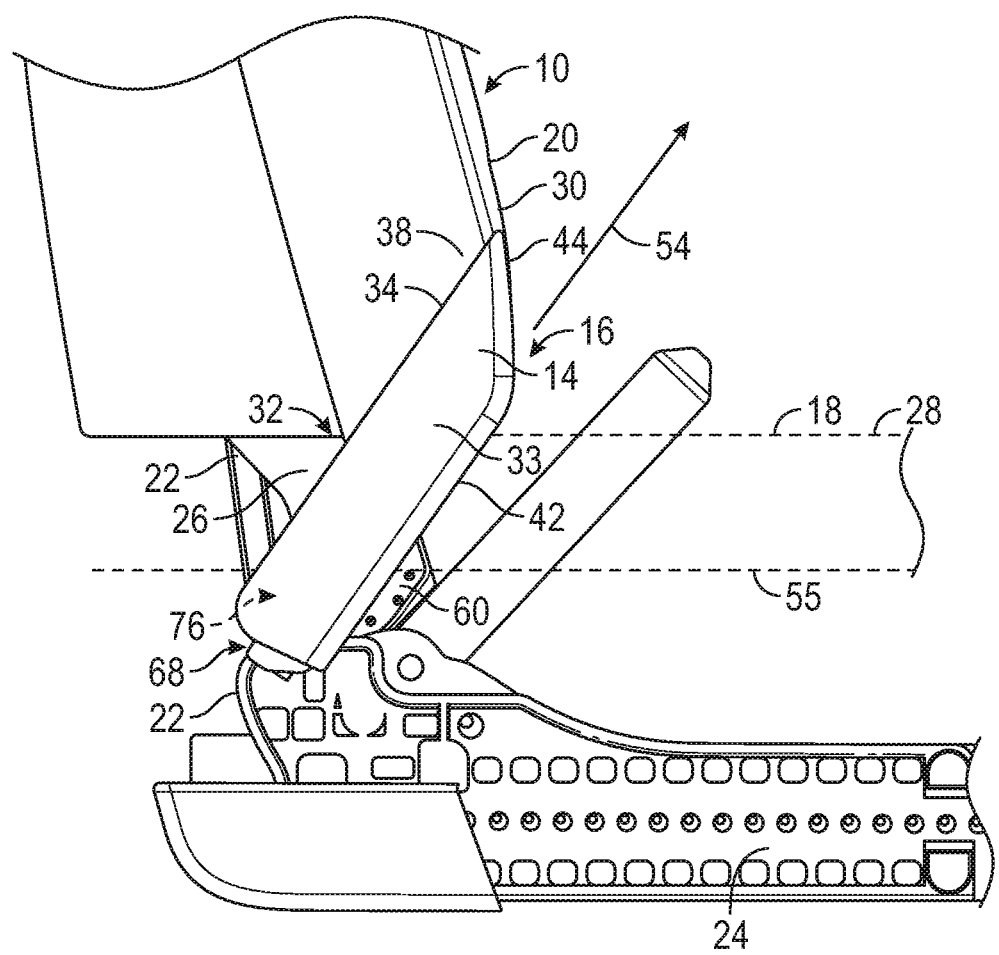
FIG. 2 illustrates a side view of a portion of a seat assembly with an armrest sub-assembly in a stowed position in accordance with an exemplary embodiment.

FIG. 1 illustrates a perspective view of two adjacent seat assemblies 10 and 12 with an armrest sub-assembly 14 in a stowed position 16 in accordance with an exemplary embodiment. FIG. 2 is a side view of a portion of the seat assembly 10 with the armrest sub-assembly 14 in the stowed position 16. Referring to FIGS. 1-2, the seat assembly 10 has a seat base portion 18 and a seat backrest portion 20 that extends substantially upright from the seat base portion 18. In one example, the seat backrest portion 20 is fixedly coupled to the seat base portion 18 such that the seat backrest portion 20 is permanently set in a substantially upright configuration. In another example, the seat assembly 10 is an adjustable seat assembly in which the seat backrest portion 20 is pivotably coupled to the seat base portion 18 for movement between a substantially upright position and, for example, a substantially reclined and/or inclined (e.g., forward leaning) position(s).

As illustrated, the seat assembly 10 includes a seat frame 22 for supporting the seat assembly 10. The seat frame 22 includes a seat base structure portion 24 and a seat backrest structure portion 26 that is operatively coupled (e.g., fixedly coupled or pivotably coupled) to the seat base structure portion 24 to extend in a substantially upright position from the seat base structure portion 24. The seat base structure portion 24 of the seat frame 22 supports a seat base cushion 28 that together form at least part the seat base portion 18 of the seat assembly 10. Likewise, the seat backrest structure portion 26 of the seat frame 22 supports a seat backrest cushion 30 that together form at least part the seat backrest portion 20 of the seat assembly 10. Although not illustrated, various other trim and/or shell panels or components may be directly or indirectly coupled to the seat frame 22 to form any remaining parts or sections of the seat base portion 18 and/or the seat backrest portion 20 of the seat assembly 10.

The seat frame 22 is formed of a relatively rigid material such as metal, e.g., aluminum or the like, composite, or any other frame structure material(s) known to those skilled in the art. The seat base and backrest cushions 28 and 30 are formed of a relatively flexible and/or soft material(s) such as leather, cloth or textile fabric (e.g., woven or knitted construction), thermoplastic skin material such as TPO, PVC, or the like, a bi-laminate or tri-laminate including a foam layer covered by a soft skin material layer, or any other interior trim outer flexible and/or soft skin material(s) known to those skilled in the art. The relatively soft covering material(s) may be formed using a conventional leather forming process, a thermoforming process, a slush or rotational molding process, and/or foaming process, or any other conventional process for forming an interior trim covering that is relatively flexible and/or soft.

In an exemplary embodiment, the armrest sub-assembly 14 includes an armrest portion 33 and is operatively coupled to a lower portion 32 of the seat backrest portion 20. The armrest sub-assembly 14 including the armrest portion 33 is stowed in the stowed position 16 substantially within or laterally adjacent to the seat backrest portion 20. As illustrated, the armrest portion 33 is stowed within the lower portion 32 of the seat backrest portion 20 immediately adjacent to the seat base portion 18 such that the upper surface 34 and the inboard-facing surface 36 of the armrest portion 33 are correspondingly bound by the adjacent sections 38 and 40 of the seat backrest portion 20. The bottom surface 42 of the armrest portion 33 is covered by the seat base cushion 28 and therefore, is substantially visibly concealed by the seat base portion 18. The distal forward-facing outer surface 44 of the armrest portion 33 when stowed is generally aligned or flows as a substantially continuous surface (e.g., neither substantially proud nor sunken) with the adjacent outer surface sections 46 and 48 of the seat backrest cushion 30. As such, in an exemplary embodiment, the seat backrest portion 20 defines a carve-out or pocket defined by the adjacent sections 38 and 40 of the seat backrest portion 20 in which the armrest sub-assembly 14 is stowed substantially within the carve-out or pocket (and flush with the surrounding seat backrest outer surface(s) adjacent to the carve-out or pocket) of the seat backrest portion 20 so as to be substantially integrated into the seat backrest portion 20.

Figure 3:
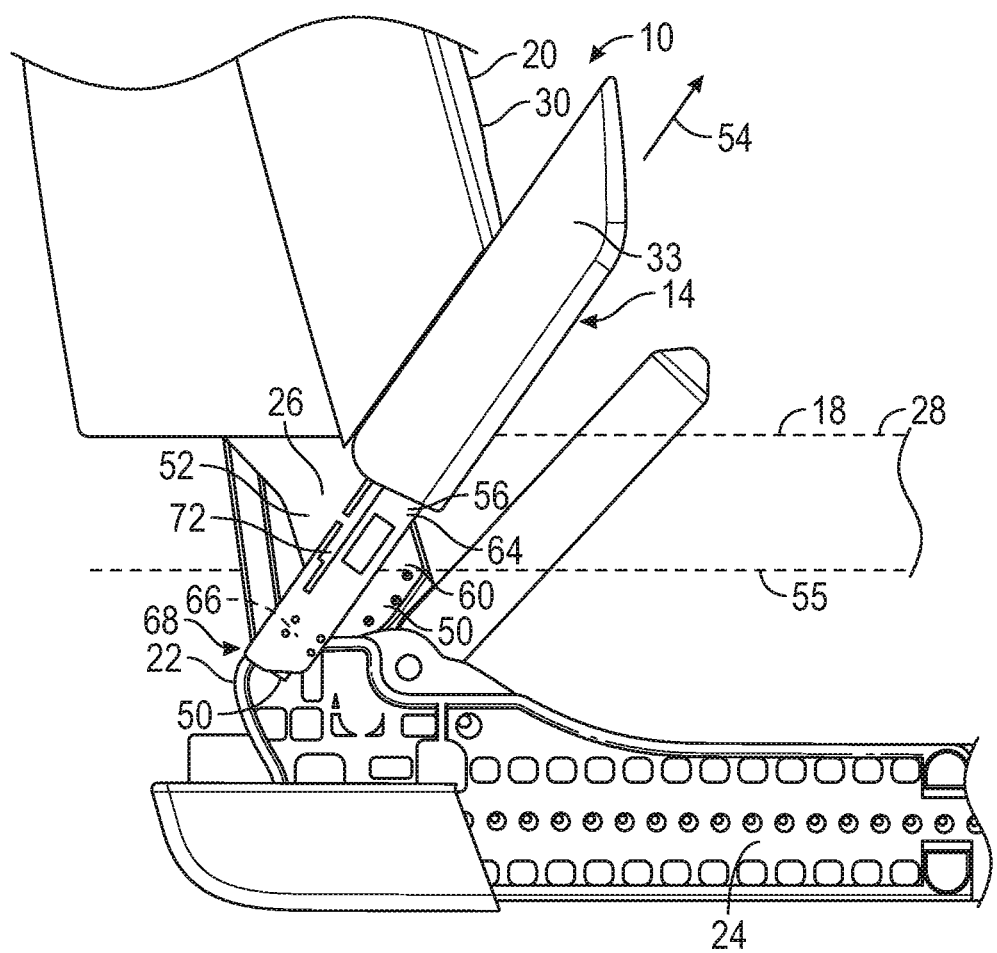
FIG. 3 illustrates a side view of a portion of a seat assembly with an armrest sub-assembly advancing from a stowed position towards an extended position in accordance with an exemplary embodiment.
Figure 4:
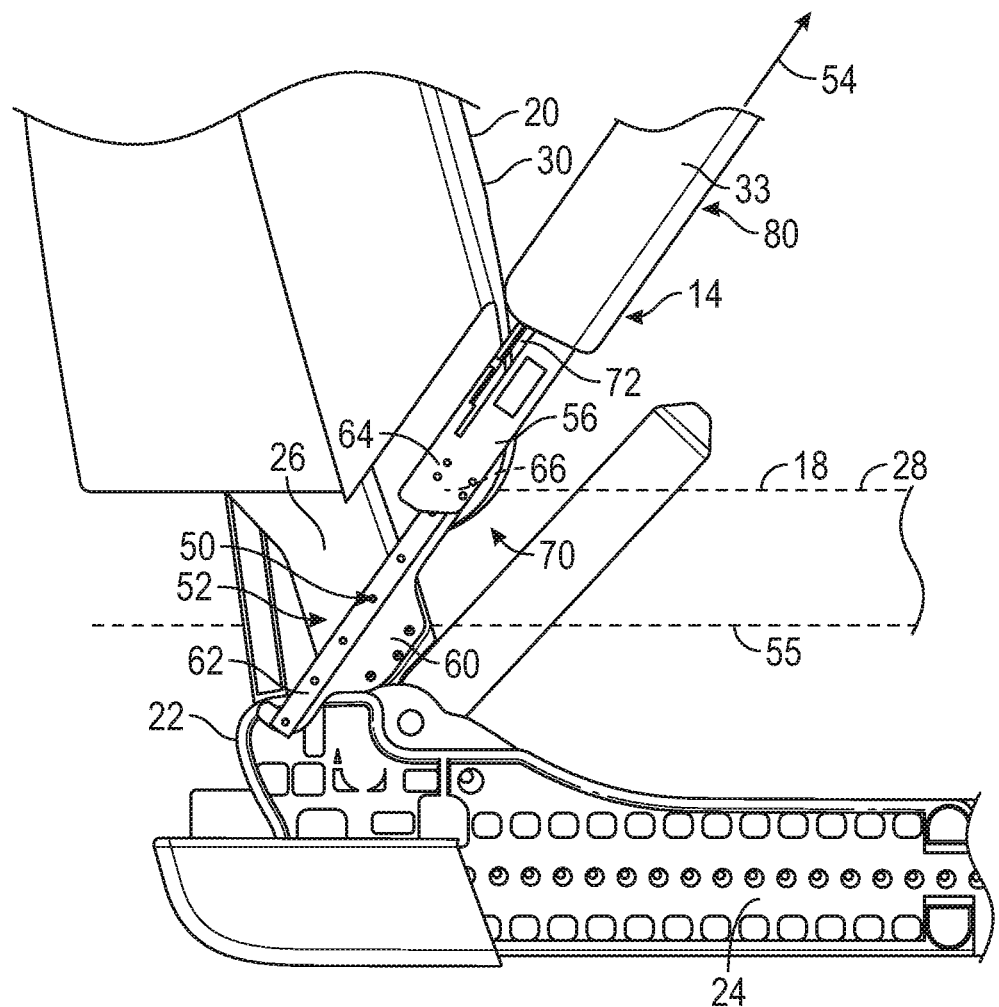
FIG. 4 illustrates a side view of a portion of a seat assembly with an armrest sub-assembly advancing further towards an extended position in accordance with an exemplary embodiment.
Figure 6:
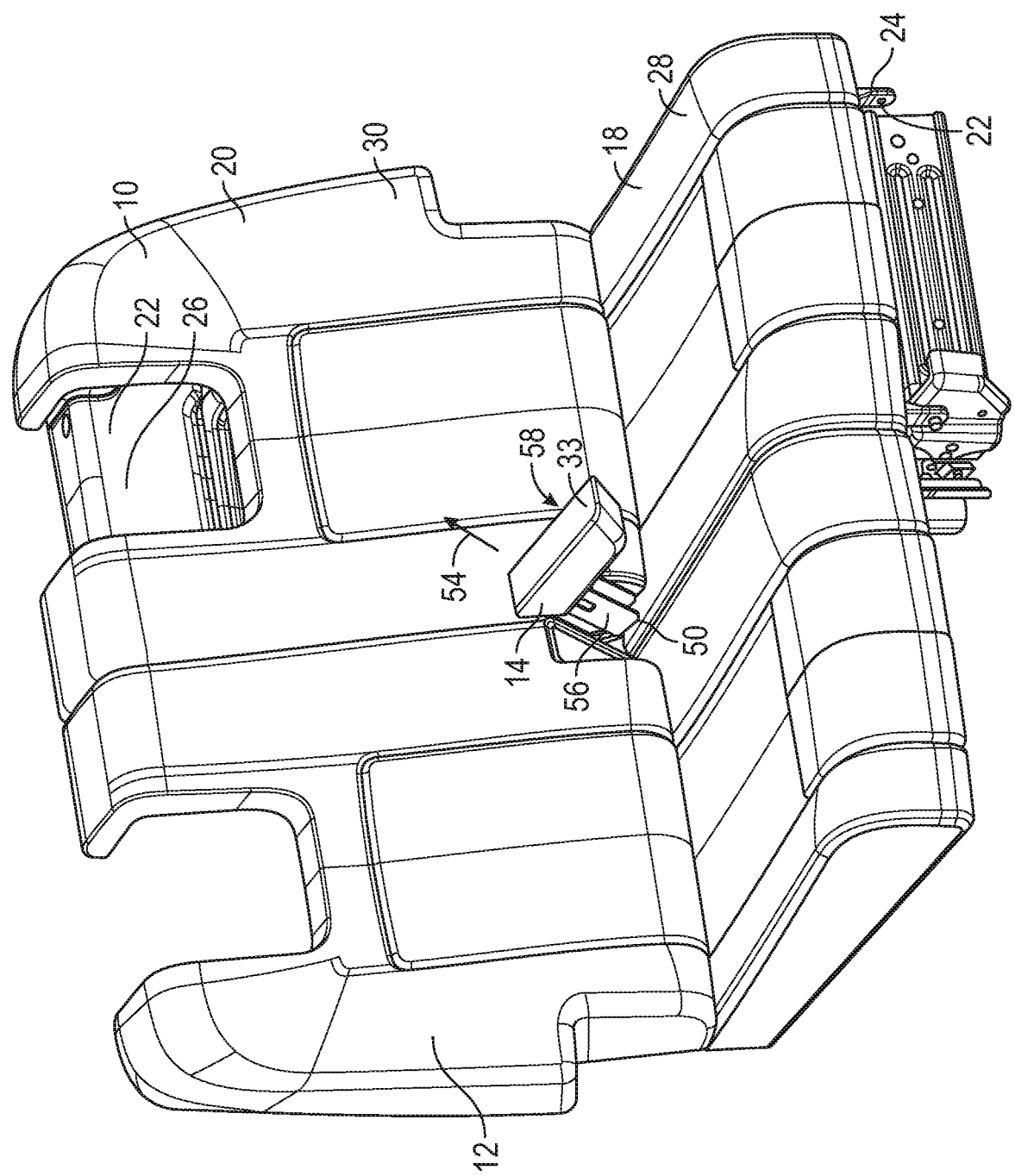
FIG. 6 illustrates a perspective view of two adjacent seat assemblies with an armrest sub-assembly in an extended position in accordance with an exemplary embodiment.

Referring also to FIGS. 3-4 and 6, the armrest sub-assembly 14 including the armrest portion 33 is configured to move between the stowed position 16 and an extended position 58 that is generally forward of the seat backrest portion 20. In an exemplary embodiment, the armrest sub-assembly 14 further includes a fixed guide structure arrangement 50 that is coupled to the seat frame 22 proximate a lower section 52 of the seat backrest structure portion 26. As illustrated, the fixed guide structure arrangement 50 is positioned to extend along an incline (indicated by single headed arrow 54) relative to the seat base portion 18 (e.g., relative to a substantially horizontal plane indicated by dashed line 55 that is defined by the seat base portion 18). As used herein, the term "incline" is understood to mean a line, plane, or surface extending at an angle that is less than 90° and greater than 0° relative to a reference plane or surface. In an exemplary embodiment, the incline 54 extends at an angle of from about 20° to about 80°, for example from about 45° to about 65°, relative to the seat base portion 18.

A movable guide extension structure 56 is slidingly coupled to the fixed guide structure arrangement 50 to translate along the incline 54. As will be discussed in further detail below, the armrest portion 33 is operatively coupled (e.g., slidingly and pivotably coupled) to the movable guide extension structure 56 to facilitate moving the armrest portion 33 from the stowed position 16 along the incline 54 towards the extended position 58.

Referring to FIGS. 2-5 and 7-8, in an exemplary embodiment, the fixed guide structure arrangement 50 includes a fixed guide support structure 60 that is coupled to the seat frame 22 proximate the lower section 52 of the seat backrest structure portion 26. A fixed track portion 62 is mounted or otherwise attached to the fixed guide support structure 60. As illustrated, the fixed track portion 62 is configured as a substantially linear or straight track section that extends along the incline 54.

In an exemplary embodiment, the movable guide extension structure 56 has a body portion 64 disposed about the fixed guide structure arrangement 50. A bearing arrangement 66 (e.g., linear bearing arrangement or the like) is disposed between the body portion 64 and the fixed guide structure arrangement 50 and is attached or otherwise coupled to the body portion 64. The bearing arrangement 66 is configured to slidingly interface or ride along the fixed track portion 62 for translating the movable guide extension structure 56 along the incline 54. In one example, the movable guide extension structure 56 translates substantially linearly along the fixed track portion 62 from a first inclined position 68 (shown in FIGS. 2 and 3) corresponding to the stowed position 16 to a second inclined position 70 (shown in FIGS. 4 and 7-8) to move the armrest portion 33 towards the extended position 58.

In an exemplary embodiment, the body portion 64 of the movable guide extension structure 56 includes a negative feature 72 that is formed therethrough. In one example, the negative feature 72 is a slot that is elongated or extends substantially parallel to the incline 54. The armrest portion 33 has a positive feature 74, such as a pin or other elongated element, extending from the armrest portion 33 through or into the negative feature 72. The positive feature 74, e.g., pin or elongated element, is configured to translate in the negative feature 72, e.g., slot, from a first slot position 76 (shown in FIGS. 2 and 7) when the armrest portion 33 is in the stowed position 16 to a second slot position 78 (shown in FIG. 7) for moving the armrest portion 33 along the incline 54 towards the extended position 58.

Figure 5:
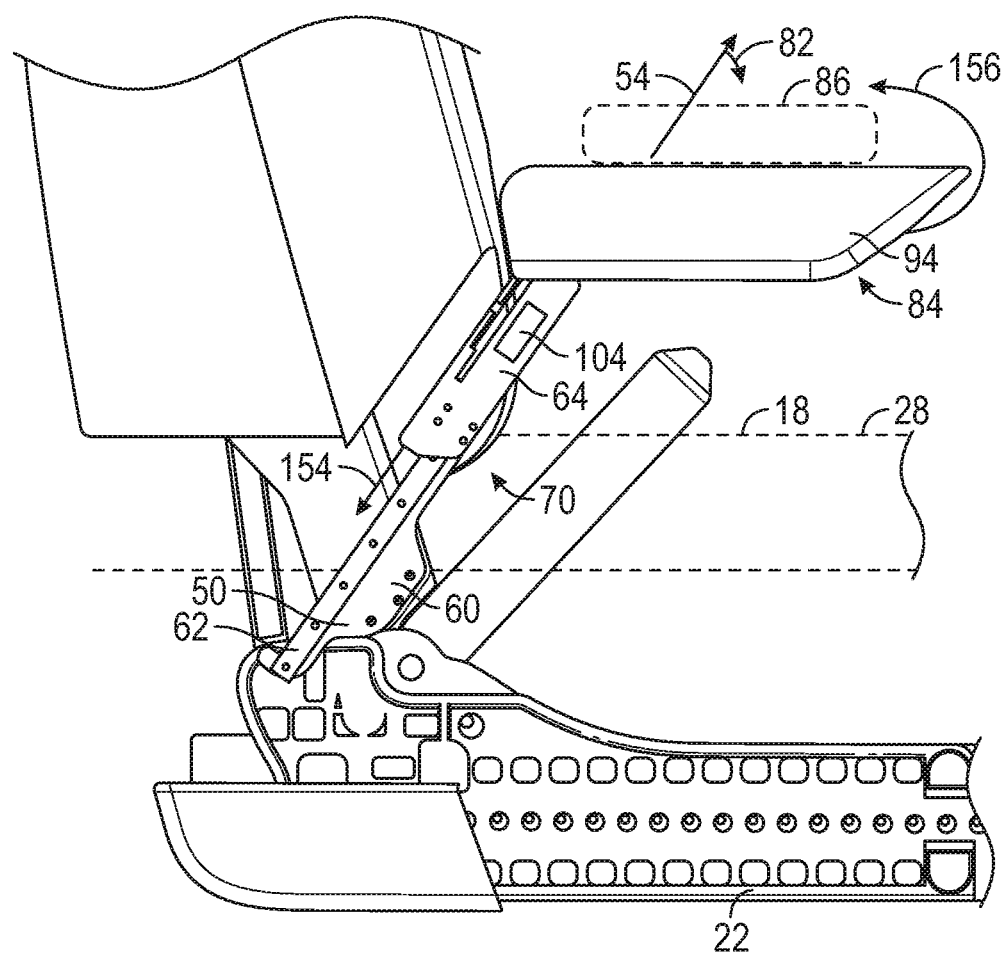
FIG. 5 illustrates a side view of a portion of a seat assembly with an armrest sub-assembly in an extended position in accordance with an exemplary embodiment.
Figure 7:
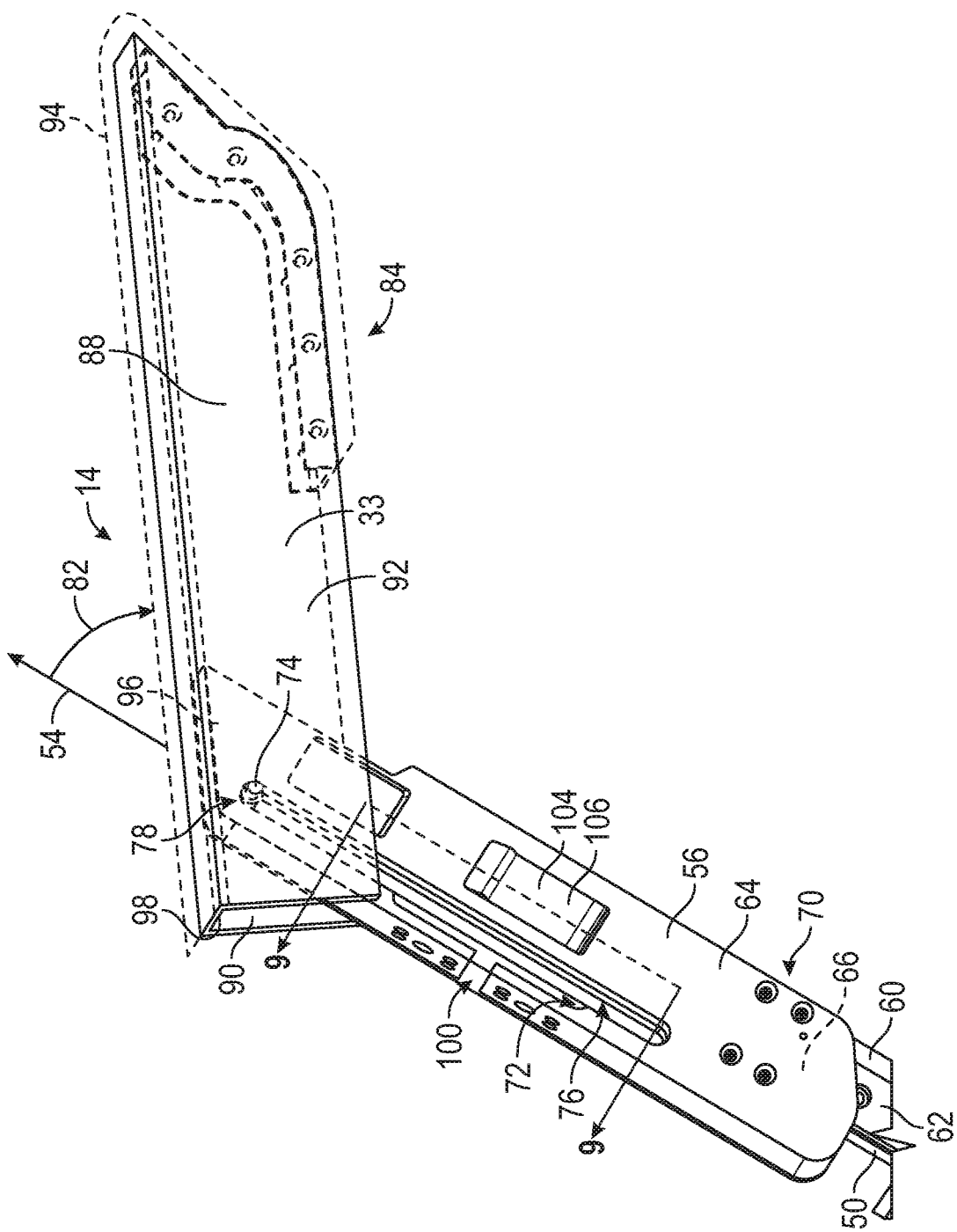
FIG. 7 illustrates a perspective side view of a portion of an armrest including a releasable stop arrangement in accordance with an exemplary embodiment.
Figure 8:
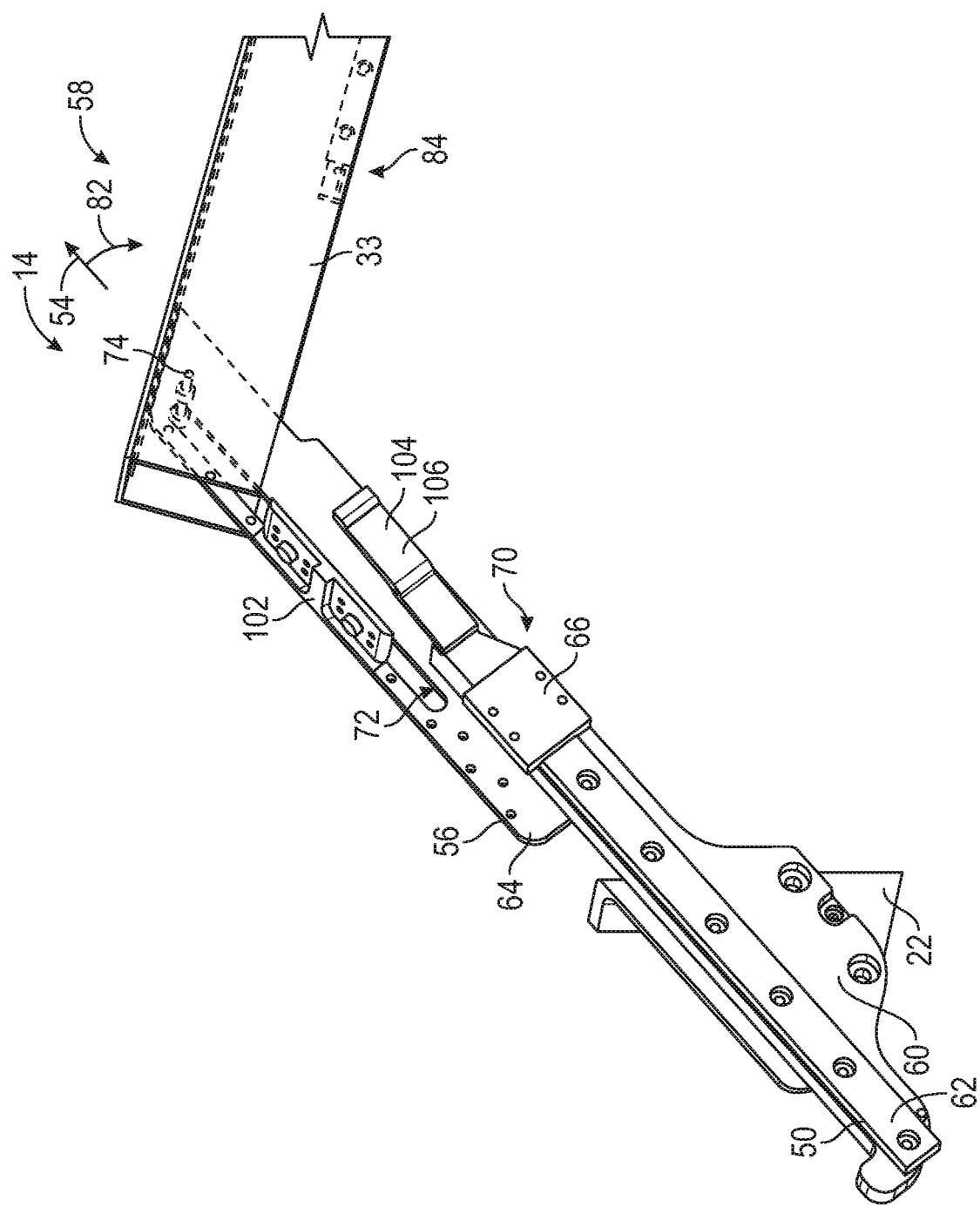
FIG. 8 illustrates a perspective side view of a portion of an armrest including a releasable stop arrangement in accordance with an exemplary embodiment.
Figure 9:
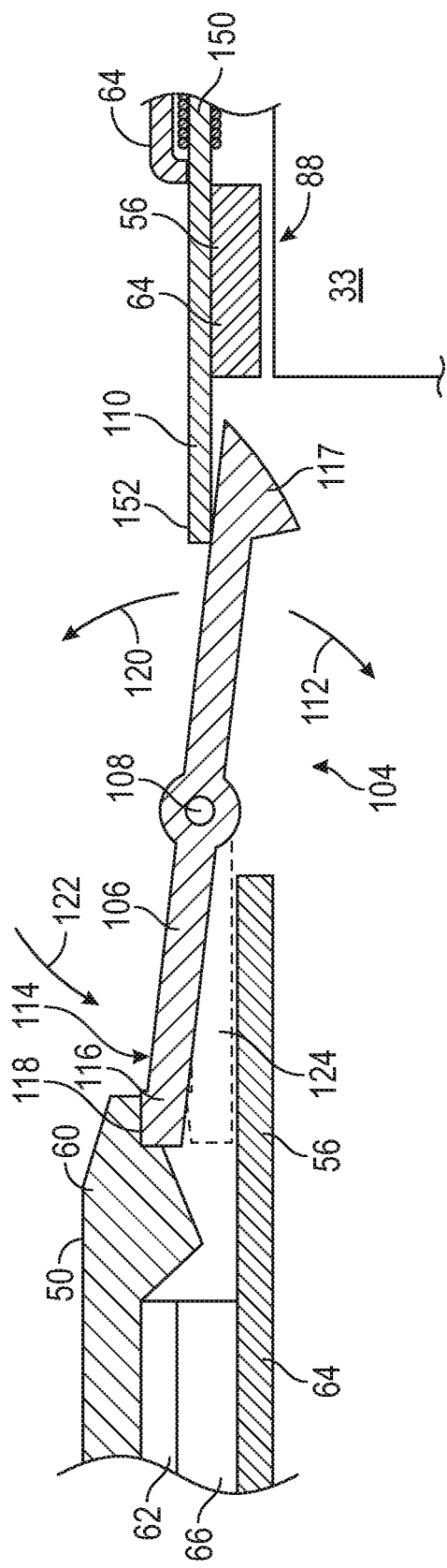
FIG. 9 illustrates a sectional view of a releasable stop arrangement depicted in FIG. 7 along line 9-9.

Referring also to FIG. 5, in an exemplary embodiment, when the positive features 74 is at or proximate the second slot position 78, the armrest portion 33 can be rotated from a first in-line position 80 (shown in FIG. 4) in a rotational direction (indicated by single headed arrow 82) towards the seat base portion 18 to a second rotated position 84 (shown in FIGS. 7-8). Translating the armrest portion 33 along the inclined 54 and rotating the armrest portion 33 to the second rotated position 84 positions the armrest portion 33 in the extended position 58 for comfortably supporting an arm 86 of a seat occupant.

In an exemplary embodiment, the armrest portion 33 includes an armrest body 88 (e.g., armrest frame or structure) that has a wall with an inner surface 90 and an outer surface 92 that is covered by an armrest covering 94 (e.g., relatively soft covering material(s)). The movable guide extension structure 56 has a distal end portion 96 that is configured to interface with an upper section 98 of the inner surface 90 of the armrest body 88 to help support the armrest portion 33 in the extended position 58 when the armrest portion 33 is in the second rotated position 84 and the positive feature 74 is in the second slot position 78.

Referring to FIGS. 5 and 7-9, in an exemplary embodiment, a releasable stop arrangement 104 is operatively coupled to the movable guide extension structure 56 to releasably lock the movable guide extension structure 56 to the fixed guide structure arrangement 50 in the second inclined position 70 during movement of the armrest portion 33 towards the extended position 58. In one example, the releasable stop arrangement 104 includes a stop body 106 that is pivotably coupled to the movable guide extension structure 56 at pivot point 108. A biasing element 110 (e.g., flat spring or the like) is coupled (e.g., glued or otherwise attached) at one end 150 to the movable guide extension structure 56 and has a free end 152 that interfaces with the stop body 106 to urge the stop body 106 in a direction (indicated by single headed arrow 112) towards a stop position 114 for releasably locking the movable guide extension structure 56 to the fixed guide structure arrangement 50 in the second inclined position 70. As illustrated, the stop body 106 has an engagement stop body portion 116 at one end and a chamfered stop body portion 117 at the other end and the pivot point 108 is disposed between the engagement and chamfered stop body portions 116 and 117. The free end 152 of the biasing element 110 pushes on the back side of the chamfered stop body portion 117 to force the chamfered stop body portion 117 in the direction 112 for engaging the engagement stop body portion 116 with a stop feature 118 (e.g., indent, step feature, or the like) formed on or in the fixed guide support structure 60 of the fixed guide structure arrangement 50 to prevent the movable guide extension structure 56 from retracting (indicated by single headed arrow 154) from the second inclined position 70 back towards the first inclined position 68.

As discussed above, the stop body 106 is releasable from the stop position 114. In particular, when the armrest portion 33 is moved from the extended position 58 back towards the stowed position 16, the armrest portion 33 is initially rotated counterclockwise (indicated by single headed arrow 156) from the second rotated position 84 to the first in-line position 80 and retracted back along the inclined 54. During retraction, the armrest body 88 of the armrest portion 33 contacts the chamfered stop body portion 117 to move the chamfered stop body portion 117 in the direction (indicated by single headed arrow 120) against the biasing element 110 to rotate the stop body 106 about the pivot point 108 and move the stop body portion 116 in a direction (indicated by single headed arrow 122) out of locked engagement with the stop feature 118 to a release position 124. This allows the movable guide extension structure 56 to be retracted from the second inclined position 70 along the inclined 54 back towards the first inclined position 68 and the stowed position 16.

Referring to FIGS. 7-8, in an exemplary embodiment, the body portion 64 has an access opening 100 formed therethrough that is open to the negative feature 72, e.g., slot, and that is sized to allow the positive feature 74 extending from the inner surface 90 of the armrest body 88 to pass therethrough for coupling and/or removing the armrest portion 33 from the movable guide extension structure 56. A bracket 102 is removably coupled to the body portion 64 and extends across the access opening 100 to prevent the positive feature 74 from exiting the negative feature 72. The access opening 100 and bracket 102 facilitate assembling the armrest portion 33 to the movable guide extension structure 56. In one example, the armrest portion 33 is fabricated as a separate piece in which the armrest covering 94 is formed over the armrest body 88 using, for example, a conventional foam covering process. After covering the armrest body 88, the armrest portion 33 is operatively coupled to the movable guide extension structure 56 by advancing the positive feature 74 through the access opening 100 into the negative feature 72 and attaching the bracket 102 to the body portion 64.

Figure 10:
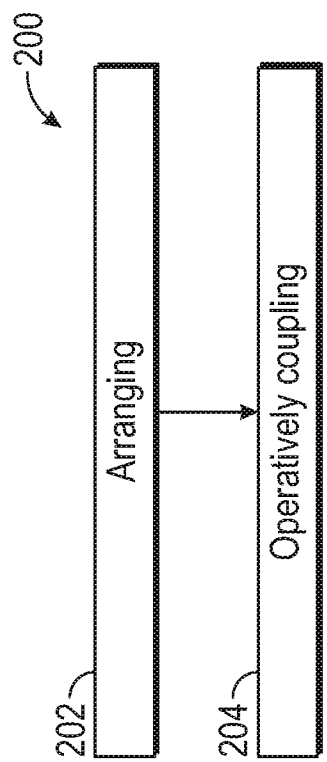
FIG. 10 illustrates a method for fabricating a seat assembly in accordance with an exemplary embodiment.

Referring to FIG. 10, a method 200 for fabricating a seat assembly in accordance with an exemplary embodiment is provided. The method 100 includes arranging (STEP 202) a seat backrest portion to extend substantially upright from a seat base portion. An armrest sub-assembly is operatively coupled (STEP 204) to the seat backrest portion such that the armrest sub-assembly is moveable between a stowed position substantially within or laterally adjacent to the seat backrest portion and an extended position that is generally forward of the seat backrest portion. At least a portion of the armrest sub-assembly translates along an incline relative to the seat base portion during movement from the stowed position towards the extended position.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly comprising:
   a seat base portion;
   a seat backrest portion coupled to the seat base portion and configured to extend substantially upright from the seat base portion; and
   an armrest sub-assembly configured to move between a stowed position that is substantially within the seat backrest portion and an extended position that is forward of the seat backrest portion, wherein at least a portion of the armrest sub-assembly translates substantially linearly along an incline that is at an angle of from 20 to 80° relative to the seat base portion and that is forward of the seat backrest portion during movement from the stowed position towards the extended position.

2. The seat assembly of claim 1, wherein the seat backrest portion has a lower portion that defines a carve-out, and wherein the armrest sub-assembly in the stowed position is disposed substantially within the carve-out of the seat backrest portion.

3. The seat assembly of claim 1, wherein during movement from the extended position to the stowed position, the armrest sub-assembly is configured such that the at least the portion of the armrest sub-assembly retracts along the incline back to the stowed position.

4. The seat assembly of claim 1, wherein the armrest sub-assembly comprises:
   an armrest portion for supporting an arm of a seat occupant when in the extended position; and
   a movable guide extension structure having a body portion, the moveable guide extension structure is coupled to the armrest portion and is configured to translate along the incline to facilitate moving the armrest portion from the stowed position towards the extended position.

5. The seat assembly of claim 4, wherein the armrest sub-assembly comprises a fixed guide structure arrangement that comprises a fixed track portion, the fixed guide structure arrangement is proximate a lower section of the seat backrest portion and extends along the incline relative to the seat base structure portion, wherein the movable guide extension structure is slidingly coupled to the fixed guide structure arrangement to translate along the fixed guide structure arrangement from a first inclined position when the armrest portion is in the stowed position to a second inclined position to move the armrest portion towards the extended position.

6. The seat assembly of claim 5, wherein the armrest portion is configured to rotate relative to the movable guide extension structure towards the seat base portion from a first position to a second rotated position, and wherein the armrest portion is in the extended position when the movable guide extension structure is in the second inclined position and the armrest portion is in the second rotated position.

7. The seat assembly of claim 6, wherein the movable guide extension structure has a negative feature and the armrest portion has a positive feature that is operatively coupled to the negative feature to allow the movable guide extension structure to rotate from the first position to the second inclined position, wherein the negative feature is a slot formed through the movable guide extension structure extending substantially parallel to the incline, and the positive feature is an elongated element extending from the armrest portion into the slot.

8. The seat assembly of claim 7, wherein the elongated element is configured to translate in the slot from a first slot position when the armrest portion is in the stowed position to a second slot position for moving the armrest portion towards the extended position.

9. The seat assembly of claim 8, wherein the armrest portion is configured to rotate to the second rotated position when the elongated element is at or proximate the second slot position.

10. The seat assembly of claim 5, wherein the armrest sub-assembly further comprises a releasable stop arrangement operatively coupled to the movable guide extension structure to releasably lock the movable guide extension structure to the fixed guide structure arrangement in the second inclined position during movement of the armrest portion towards the extended position, wherein the releasable stop arrangement is configured to unlock the movable guide extension structure from the fixed guide structure arrangement to allow the movable guide extension structure to be retracted from the second inclined position when the armrest portion is moved from the extended position towards the stowed position, wherein the releasable stop arrangement comprises;
   a stop body; and
   a biasing element that comprises a spring and that interfaces with the stop body to urge the stop body towards a stop position for releasably locking the movable guide extension structure to the fixed guide structure arrangement in the second inclined position.

11. The seat assembly of claim 10, wherein the stop body has a chamfered stop body portion configured to contact the armrest portion when the armrest portion is moved from the extended position towards the stowed position to release the stop body from the stop position to a release position that allows the movable guide extension structure to translate along the fixed guide structure arrangement.

12. The seat assembly of claim 10, wherein the fixed guide structure arrangement has a stop feature and the stop body has an engagement stop body portion that is configured to engage the stop feature to releasably lock the movable guide extension structure in the second inclined position during movement of the armrest portion towards the extended position, wherein the stop feature is defined by one of an indent and a step.

13. The seat assembly of claim 5, wherein the fixed guide structure arrangement comprises the fixed track portion and the movable guide extension structure comprises a bearing arrangement that is configured to slide along the fixed track portion to translate the movable guide extension structure between the first and second inclined positions, wherein the bearing arrangement comprises at least one bearing.

14. The seat assembly of claim 6, wherein the movable guide extension structure has a distal end portion that is configured to interface with the armrest portion to help support the armrest portion in the extended position when the armrest portion is in the second rotated position.

15. The seat assembly of claim 7, wherein the movable guide extension structure has the body portion with the slot formed therethrough, and the body portion has an access opening formed therethrough open to the slot and configured to allow the elongated element to pass therethrough for coupling and/or removing the armrest portion from the movable guide extension structure, and wherein the movable guide extension structure comprises a bracket that is removably coupled to the body portion and that extends across the access opening to prevent the elongated element from exiting the slot.

16. A seat assembly comprising:
   a seat frame comprising a seat base structure portion and a seat backrest structure portion that is configured to extend substantially upright from the seat base structure portion;
   a seat base portion comprising a seat base cushion supported by the seat base structure portion;
   a seat backrest portion comprising a seat backrest cushion supported by the seat backrest structure portion; and
   an armrest sub-assembly configured to move between a stowed position that is substantially within the seat backrest portion and an extended position that is forward of the seat backrest portion, wherein at least a portion of the armrest sub-assembly translates substantially linearly along an incline that is at an angle of from 20 to 80° relative to the seat base portion and that is forward of the seat backrest portion during movement from the stowed position towards the extended position, the arm rest sub-assembly comprising:
      a fixed guide structure arrangement that comprises a fixed track portion, the fixed guide structure arrangement is coupled to the seat frame proximate a lower section of the seat backrest structure portion and extends along an incline relative to the seat base portion;
      a movable guide extension structure has a body portion, the moveable guide extension structure is slidingly coupled to the fixed guide structure arrangement to translate along the incline; and
      an armrest portion having a distal forward-facing outer surface, wherein the armrest portion is coupled to the movable guide extension structure to facilitate moving the armrest portion from the stowed position towards the extended position, and wherein in the stowed position the distal forward-facing outer surface of the armrest portion is aligned with adjacent outer surface portions of the seat backrest cushion, and in the extended position the armrest portion is forward of the seat backrest cushion.

17. A method for fabricating a seat assembly, the method comprising:
   arranging a seat backrest portion to extend substantially upright from a seat base portion; and
   operatively coupling an armrest sub-assembly to the seat backrest portion such that the armrest sub-assembly is moveable between a stowed position that is substantially within the seat backrest portion and an extended position that is forward of the seat backrest portion, wherein at least a portion of the armrest sub-assembly translates substantially linearly along an incline that is at an angle of from 20 to 80° relative to the seat base portion and that is forward of the seat backrest portion during movement from the stowed position towards the extended position.

* * * * *